(12) United States Patent
Yun et al.

(10) Patent No.: US 6,600,934 B1
(45) Date of Patent: Jul. 29, 2003

(54) DEVICE AND METHOD FOR PROVIDING SELECTION TRANSMIT DIVERSITY IN MOBILE COMMUNICATION SYSTEM

(75) Inventors: Yu-Suk Yun, Seoul (KR); Jae-Min Ahn, Seoul (KR); Joong-Ho Jeong, Seoul (KR); Soon-Young Yoon, Seoul (KR); Young-Ky Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/337,299

(22) Filed: Jun. 21, 1999

(30) Foreign Application Priority Data

Jun. 20, 1998 (KR) ......................................... 1998-23299

(51) Int. Cl.7 ............................. H04B 1/38; H04M 1/00
(52) U.S. Cl. ......................... 455/562; 455/101; 455/69
(58) Field of Search ................................. 455/561, 562, 455/69, 101

(56) References Cited

U.S. PATENT DOCUMENTS

| | | | | |
|---|---|---|---|---|
| 4,242,538 A | * | 12/1980 | Ito | 455/422 |
| 5,097,484 A | * | 3/1992 | Akaiwa | 375/267 |
| 5,465,269 A | * | 11/1995 | Schaffner | 375/144 |
| 6,097,711 A | * | 8/2000 | Okawa | 370/335 |

* cited by examiner

*Primary Examiner*—Vivian Chin
*Assistant Examiner*—J Moore
(74) *Attorney, Agent, or Firm*—Dilworth & Barrese, L.L.P.

(57) ABSTRACT

An STD (Selection Transmit Diversity) communication method. In the method, a base station selects a transmission antenna corresponding to an antenna selection signal received from a terminal, transmits a traffic channel signal through the selected antenna, and transmits a predetermined part of the traffic channel signal through an unselected antenna.

18 Claims, 9 Drawing Sheets

DEVICE AND METHOD FOR PROVIDING SELECTION TRANSMIT DIVERSITY IN MOBILE COMMUNICATION SYSTEM

BACKGROUND OF THE INVENTION

1. Field of the Invention

The present invention relates to data communication device and method in a mobile communication system, and in particular, a device and method for communicating data with selection transmit diversity (STD).

2. Description of the Related Art

Transmit diversity technology offers the advantage of receiver diversity without increasing receiver complexity. STD also makes the advantage of receiver diversity possible without requiring a great modification to the structure of a terminal, and thus increases the capacity of a reverse link in digital cellular mobile communication. Implementation of STD in mobile communications requires the use of plural antennas for a base station as well as the following.

The STD function in a mobile communication system requires a terminal that measures the channel qualities of signals received from antennas of a base station, as well as receives data, and notifies the base station of the measurement result. For this purpose, the base station has forward link common channels assigned to the respective antennas, which are mutually orthogonal. The terminal compares the channel qualities of the antennas by the forward common channels assigned t the respective antenna, and transmits an antenna selection message to the base station to tell the base station to send data through the best channel quality antenna.

In operation, the terminal measures the channel qualities of the antennas for a predetermined time, and sends the base station the antenna selection message for selecting a transmission antenna on the basis of the measurement. Here, the predetermined time is an integer multiple of a power control group (PCG). The base station sends the terminal an antenna reference signal indicative of an antenna in current use for transmission. Then, the terminal can detect the transmission quality of the antenna selection message by comparing the base station antenna used for current transmission data with the antenna selected by the terminal.

Figure 1:
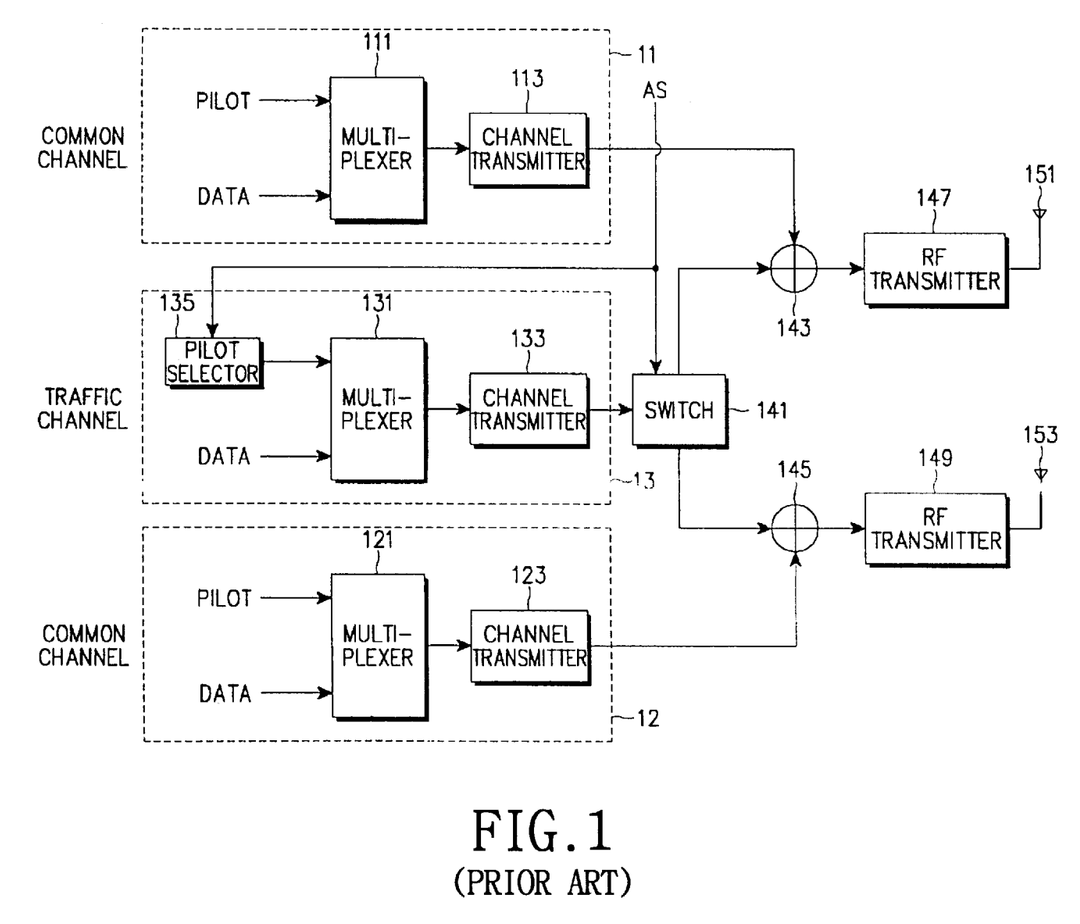
FIG. 1 is a block diagram of a conventional STD transmitting device.

FIG. 1 is a block diagram of a conventional STD transmitting device in which a common channel signal is transmitted through each transmission antenna and data is transmitted through a transmission antenna selected based on an antenna selection message received from a terminal. In this example, two transmission antennas are associated with a base station.

Figure 2:
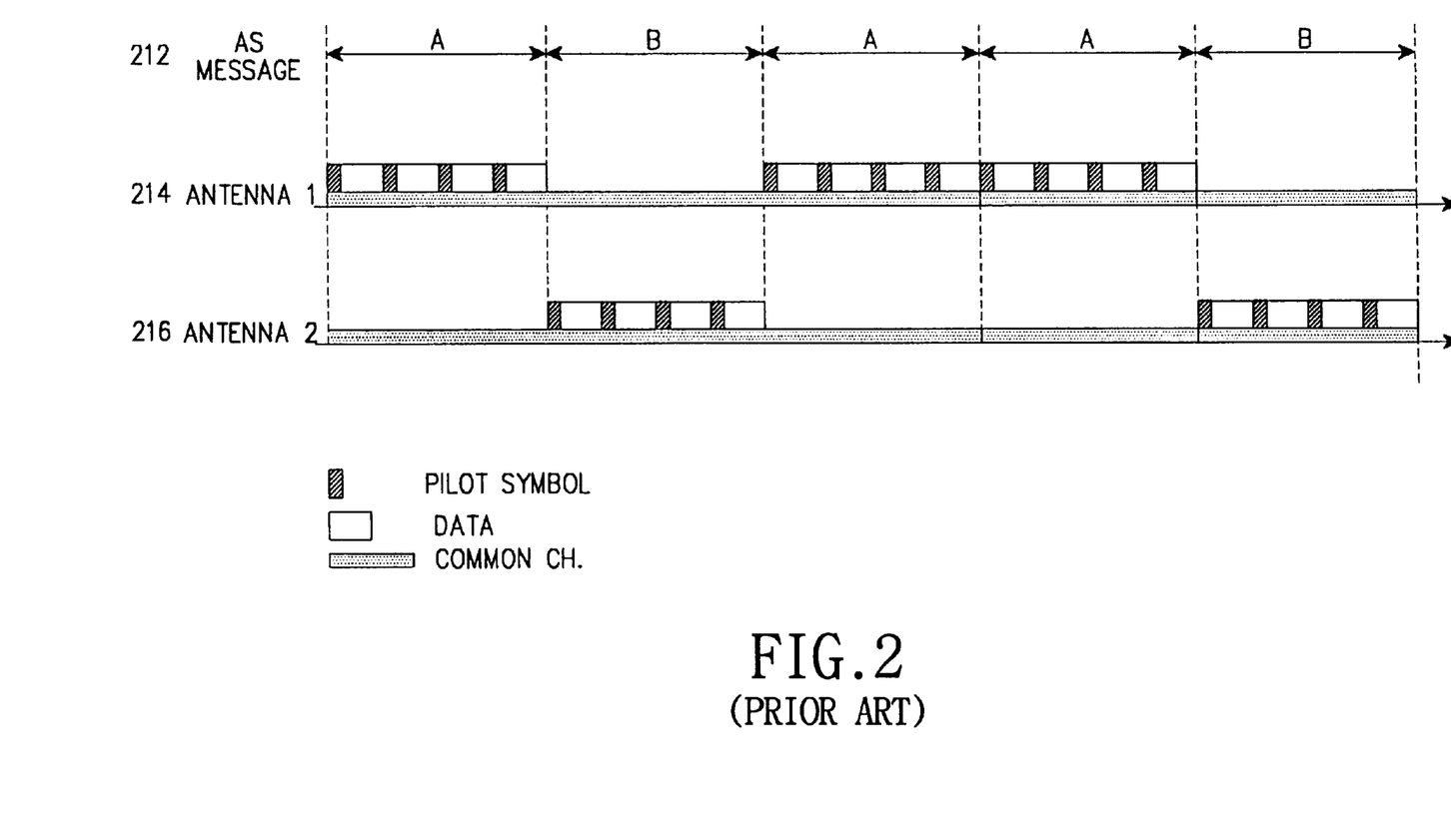
FIG. 2 is a diagram of signal transmission with respect to a conventional STD operation mode.

FIG. 2 illustrates the operation of the conventional STD transmitting device of FIG. 1, in which common channel signals are transmitted consistently through corresponding transmission antennas 151 and 153, and data is transmitted through a transmission antenna selected based on an antenna selection message received at a predetermined rate.

Referring to FIGS. 1 and 2, first and second common channel transmitters 11 and 12 are of the same configuration. They generate common channel signals to be transmitted via the first and second antennas 151 and 153, respectively. The first common channel transmitter 11 is comprised of a multiplexer 111 for multiplexing a pilot signal and data and a channel transmitter 113 for subjecting a common channel signal received from the multiplexer 111 to channel coding, rate matching, channel interleaving, orthogonal code modulation, and PN (Pseudo-Noise) sequence spreading.

The second common channel transmitter 12 is comprised of a multiplexer 121 for multiplexing a pilot signal and data and a channel transmitter 123 for subjecting a common channel signal received from the multiplexer 121 to channel coding, rate matching, channel interleaving, orthogonal code modulation, and PN sequence spreading.

A traffic channel transmitter 13 generates traffic data to be transmitted from the STD transmitting device. In the traffic channel transmitter 13, a pilot selector 135 generates a corresponding pilot signal in response to an antenna selection message AS fed back from the terminal. A multiplexer 131 multiplexes the pilot signal received from the pilot selector 135 and traffic channel data. A channel transmitter 133 subjects the traffic channel signal received from the multiplexer 131 to orthogonal code modulation and PN sequence spreading.

A switch 141 switches the traffic channel signal based on the antenna selection message AS, and has an input terminal coupled to the output terminal of the traffic channel transmitter 13, a first output terminal directed toward the first antenna 151, and a second output terminal directed toward the second antenna 153. Hence, the switch 141 switches the traffic channel signal to the first or second antenna 151 or 153 according to the antenna selection message AS. An adder 143 adds a signal received from the first output terminal of the switch 141 and a signal received from the first common channel transmitter 11 to provide a signal indicated by 214 in FIG. 2. An adder 145 adds a signal received from the second output terminal of the switch 141 and a signal received from the second common channel transmitter 12 to provide a signal indicated by 216 in FIG. 2. A first RF (Radio Frequency) transmitter 147 is coupled between the adder 143 and the first antenna 151, and a second RF transmitter 149 between the adder 145 and the second antenna 153, for converting their corresponding transmit signals to RF signals.

In the conventional STD operation, common channel signals to be transmitted through the antennas 151 and 153 are generated by multiplexing pilot symbols and data and subjecting the multiplexed signals to spectrum spreading. A traffic channel signal is generated by multiplexing a pilot symbol and data selected based on message AS and subjecting the multiplexed signals to spectrum spreading. The resulting traffic channel signal and a corresponding common channel signal are added into the signal as indicated by 214 or 216 of FIG. 2 to be transmitted via an antenna selected by the antenna selection message AS indicated by 212 of FIG. 2. The unselected antenna sends a common channel signal 214 or 216 alone.

The above conventional technology, however, has the shortcoming that a base station always sends common channel signals through corresponding plural antennas. Since all the users in a cell do not own terminals adapted to STD, continuous transmission of the common channel signals for some STD terminals results in a waste of forward code resources and transmit power.

SUMMARY OF THE INVENTION

An object of the present invention, therefore, is to provide a STD communicating device and method in a mobile communication system.

Another object of the present invention is to provide a STD transmitting device and method in a mobile communication system, in which a common channel signal is transmitted through a transmission antenna and a traffic channel signal is transmitted through a transmission antenna selected based on an antenna selection message, to thereby enable efficient use of forward code resources and transmit power.

To achieve these and other objects, there is provided a STD communication device and method. In a STD communication method according to the present invention, a base station selects a transmission antenna corresponding to an antenna selection signal received from a terminal, transmits a traffic channel signal through the selected antenna, and transmits a predetermined part of the traffic channel signal through an unselected antenna.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENTS

The present invention is directed to a CDMA (Code Division Multiple Access) mobile communication system with Selection Transmit Diversity (STD) to efficiently use forward code resources and transmit power. To do this, a base station sends a common channel signal through one of a plurality of antennas, and a traffic channel signal through any of the antennas regardless of antenna selection based on an antenna selection message in order to allow a terminal to measure channel qualities. The segments of a signal to be transmitted via an unselected antenna are known to both the base station and the terminal. This can be devised in accordance with a preset standard through product design or mutual appointment during a call set-up. The channel qualities of transmit signals from antennas are measured in the terminal by analyzing predetermined symbols of a traffic channel, which are differently assigned to the respective antennas.

Before presenting a complete description of the present invention, the key terms used to set forth the invention are listed below.

Common channel: a channel used by a terminal to detect a base station and measure its receive level; traffic channel: a channel for transmitting a control signal or data between a base station and a terminal; antenna selection message (AS): a message commanding a traffic channel signal to be transmitted through the antenna exhibiting good reception quality according to measurement of the channel qualities at the terminal; pilot symbol: a transmission symbol for providing time synchronization and demodulation needed to receive other signals and enabling a terminal to identify a currently used antenna due to its orthogonal pattern for each antenna in a STD mobile communication system; PCG (Power Control Group): a duration time for controlling forward link power in a base station; frame: the size of unit data to be transmitted, consisting of "N" PCGs (herein, 16 PCGs); and subframe: the size of unit data transmitted before switching antennas determined by the AS message, consisting of an integer times the PCG (that is, "M" PCGs). A single frame includes a plurality of subframes. In the embodiments of the present invention, a frame has 4 subframes, and each subframe has 4 PCGs.

Figure 3:
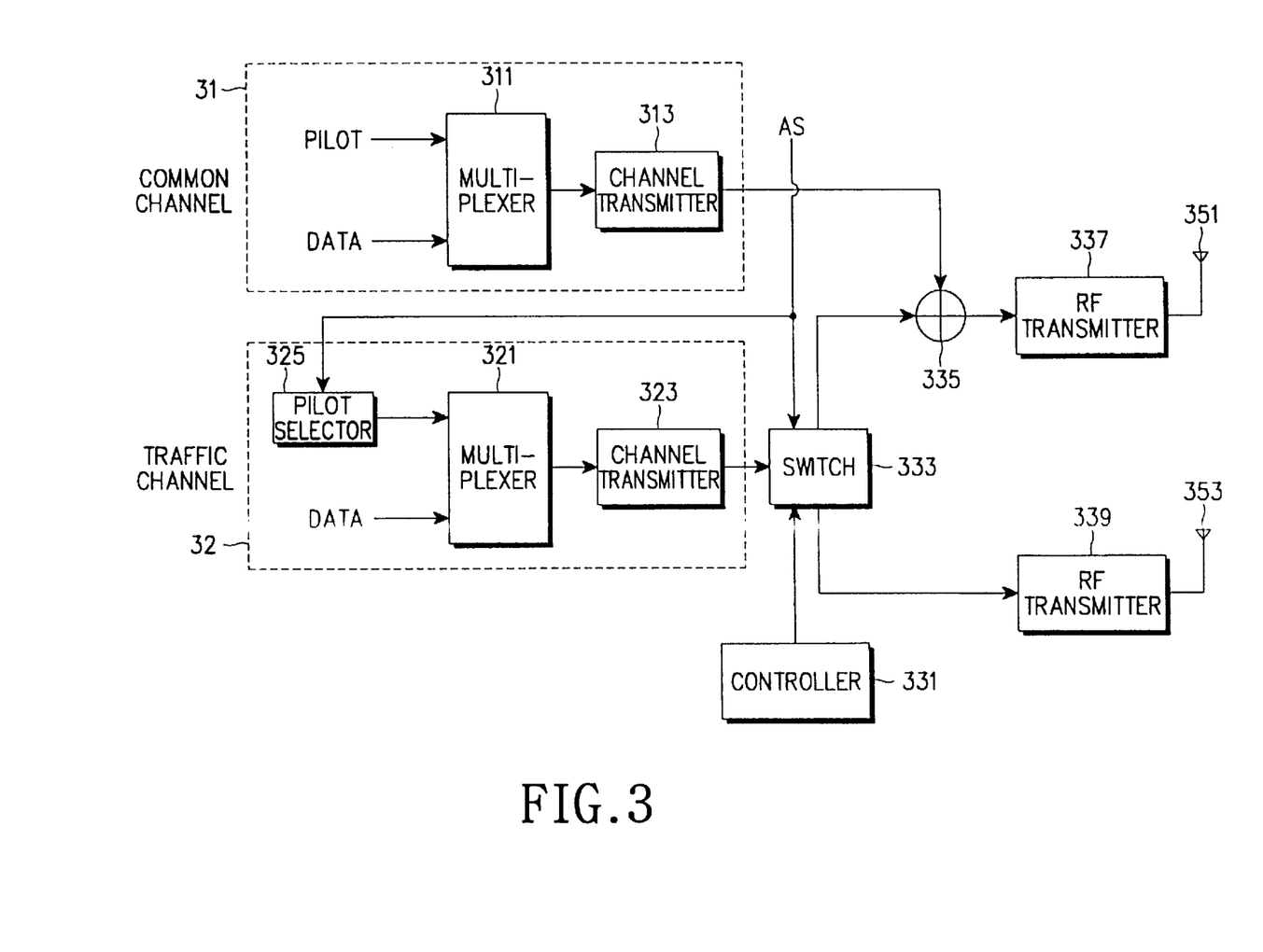
FIG. 3 is a block diagram of an STD transmitting device according to the present invention.

Referring now to FIG. 3, FIG. 3 is a block diagram of an STD transmitting device according to an embodiment of the present invention. The common channel is transmitted only through a single antenna, and the traffic channel is transmitted through an antenna selected based on an antenna selection message. In FIG. 3, the common channel signal is output through a first antenna 351.

In FIG. 3, a common channel transmitter 31 generates the common channel signal which is to be transmitted through the first antenna 351. In the common channel transmitter 31, a multiplexer 311 multiplexes an input pilot signal and data. A channel transmitter 313 includes at least a channel coder, a rate matcher, a channel interleaver, an orthogonal code modulator, and a PN sequence spreader, for converting a common channel signal received from the multiplexer 311 to a signal for transmission.

A traffic channel transmitter 32 generates traffic data to be transmitted from the STD transmitting device. In the traffic channel transmitter 32, a pilot selector 325 generates a pilot signal according to an antenna selection message AS fed back from a terminal. A multiplexer 321 multiplexes the pilot signal received from the pilot selector 325 and data. A channel transmitter 323 includes at least an orthogonal code modulator and a PN sequence spreader, for converting a traffic channel signal received from the multiplexer 321 to a signal for transmission.

A switch 333 receives input from an input terminal coupled to an output terminal of the traffic channel transmitter 32, and outputs through a first output terminal directed to the first antenna 351, and a second output terminal directed to a second antenna 353, and is controlled by the antenna selection message AS. Thus, in this embodiment, the switch 333 switches between the first and second antennas 351 and 353 according to the antenna selection message AS. An adder 335 adds a signal received from the switch 333 to the common channel signal received from the common channel transmitter 31. A first RF transmitter 337 is coupled between the adder 335 and the first antenna 351, and a second RF transmitter 339 between the switch 333 and the second antenna 353, for converting their respective received signals to RF signals.

Figure 4:
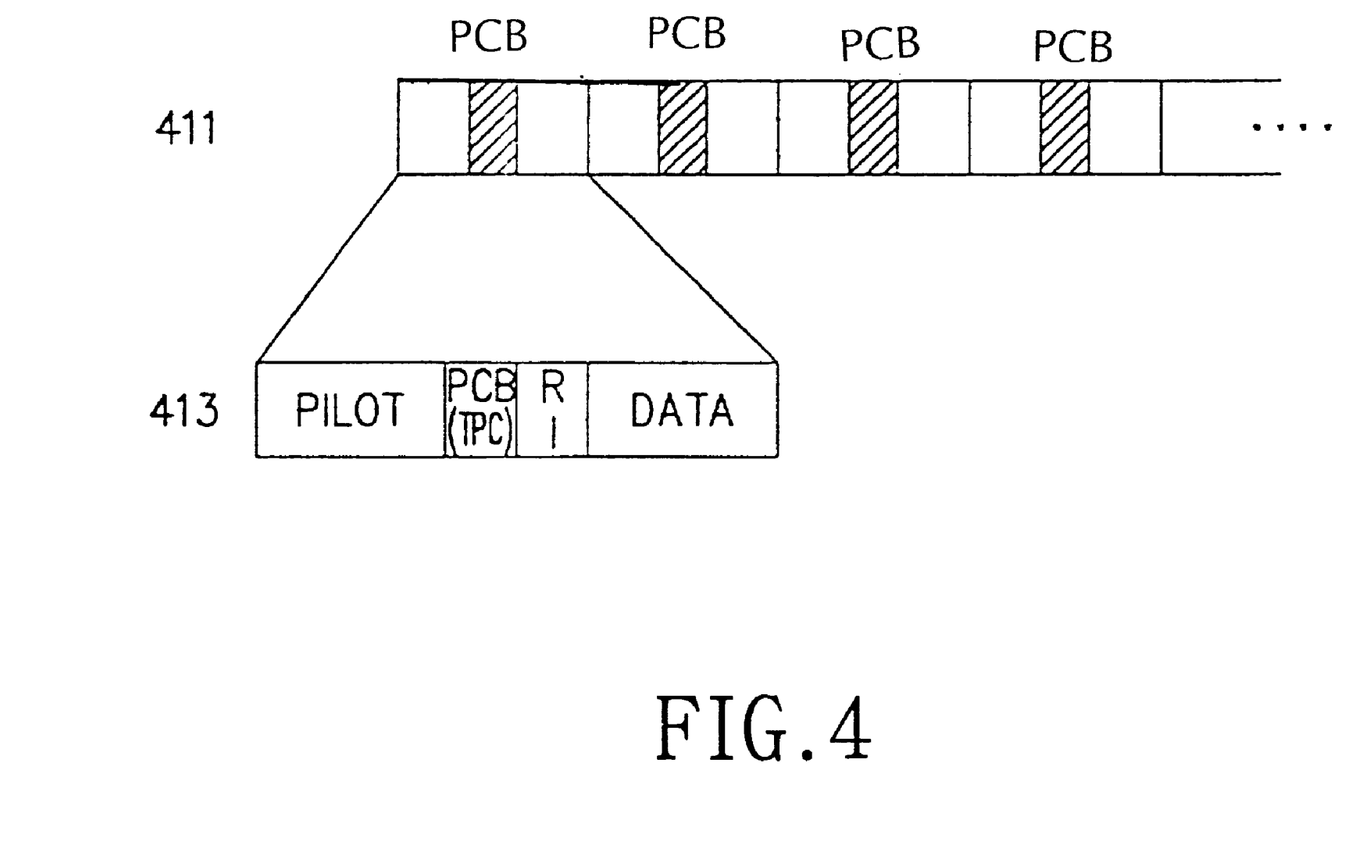
FIG. 4 illustrates a frame structure and PCGs output from the transmitting device shown in FIG. 3.

FIG. 4 illustrates a subframe of the traffic channel signal output from the channel transmitter 323. Here, it is assumed that 4 PCGs are assigned to each subframe as indicated by 411. A PCG has a pilot symbol, a power control bit (PCB or TPC: Transmit Power Control command), rate information (RI), and data. The pilot symbol is a code mutually appointed between a base station and a terminal and can be used for the terminal to measure transmit power of the base station. The PCB is information for controlling signal strength in a PCG unit, and RI indicates the transmission rate of a signal from the base station.

Referring to FIGS. 3 and 4, the common channel signal is generated by multiplexing a pilot symbol and data in the multiplexer 311 and subjecting the multiplexed signal to spreading and modulation in the channel transmitter 313. Then, the adder 335 adds the common channel signal to the traffic channel signal which is to be transmitted through the first antenna 351. The traffic channel signal is generated by multiplexing a pilot signal and data to be transmitted in the multiplexer 321 and subjecting the multiplexed signal to spreading and modulation in the channel transmitter 323. The transmit signal output from the traffic channel transmitter 323 has the format of FIG. 4. Then, the switch 333 selects a transmission path for the traffic channel signal based on the antenna selection message AS received from the terminal and outputs the traffic channel signal through the first or second antenna 351 or 353.

A controller 331 controls the switch 333, and can switch a data subframe unit, thereby outputting segments of, or whole, or several predetermined PCG through an antenna other than the antenna currently transmitting the traffic channel signal. The switch 333 switches the pilot symbol of a predetermined PCG or a predetermined PCG signal of the traffic channel signal to the unused antenna under the control of the controller 331. For example, while the traffic channel signal is transmitted through the first antenna 351 in a subframe unit as shown in FIG. 4, the pilot symbol of a predetermined PCG or a predetermined PCG signal in a corresponding subframe is output through the second antenna 353. Therefore, the STD transmitting device outputs a traffic channel signal in a subframe unit through a selected antenna and, at the same time, the pilot symbol of a predetermined PCG in a corresponding subframe through an unselected antenna, so that the terminal can compare the channel qualities of the antennas, by using the traffic channel instead of the common channel.

Figure 5:
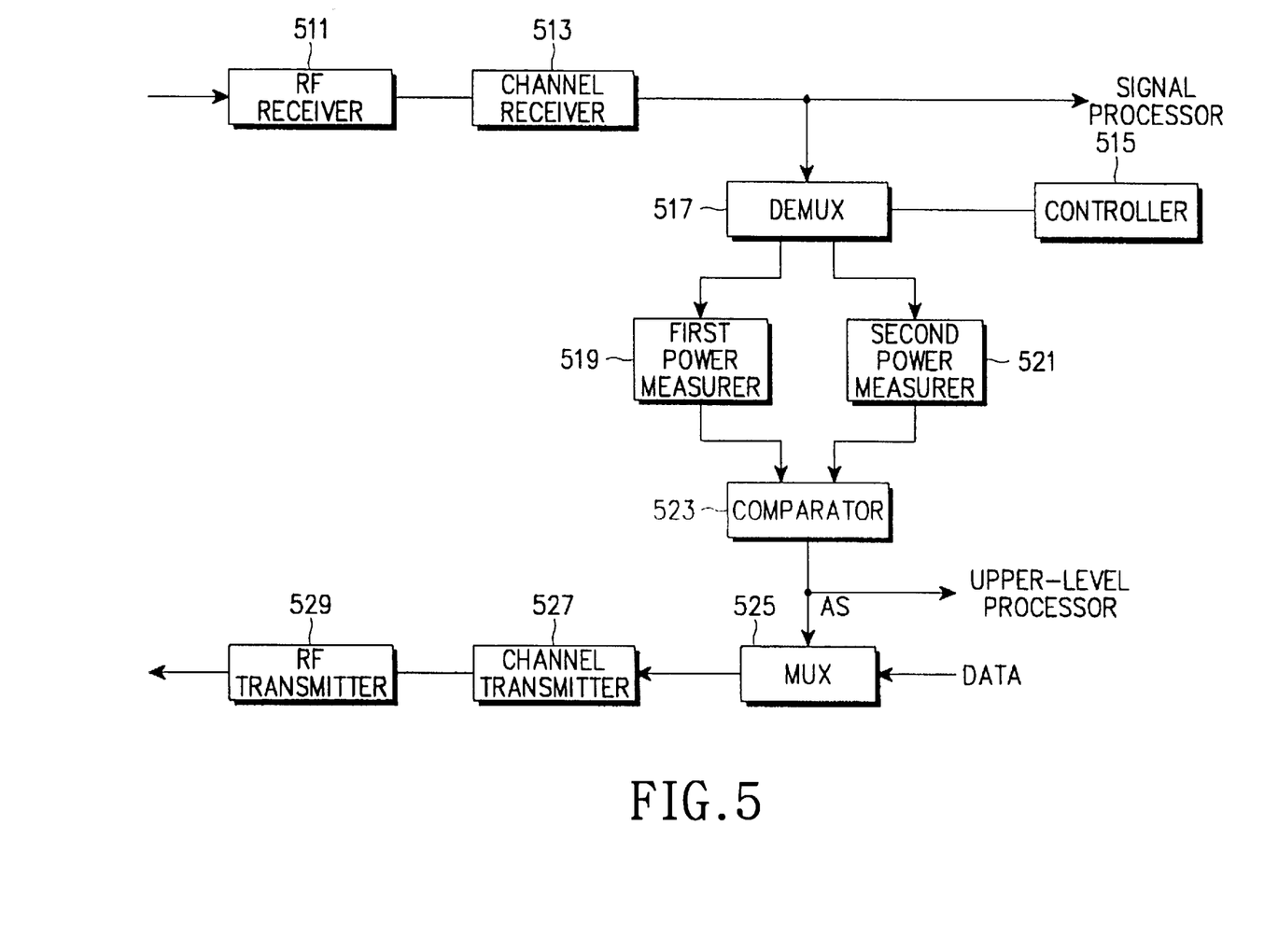
FIG. 5 is a block diagram of a receiving device for receiving a signal from the STD transmitting device of FIG. 4 and generating a message for selecting a good quality antenna.

A receiving device for receiving the traffic channel signal from the plurality of antennas of the STD transmitting device analyzes the qualities of transmit signals from the respective antennas and generates an antenna selection message for instructing the base station to transmit the traffic channel signal via an antenna showing a good channel quality. FIG. 5 is a block diagram of a receiving device for receiving a transmit signal from the STD transmitting device of the present invention.

Referring to FIG. 5, an RF receiver 511 receives an RF signal from the STD base station. A channel receiver 513 despreads and demodulates the signal received from the RF receiver 511 and feeds the resulting signal to a signal processor and a switch 517.

A controller 515 controls the switch 517 in the same manner as from the controller 331 of the base station. That is, the controller 515 selects a path for the traffic channel signal in a subframe unit, and generates the switch control signal for separating sections of a corresponding subframe. In this way, the device can discriminate between a signal of a selected antenna and a signal of an unselected antenna. Switch 517 switches the signal received from the channel receiver 513 through a first or second output terminal under the control of the controller 515. In the example of FIG. 4, the switch 517 separately outputs the pilot symbols of the traffic channel signal, which were transmitted through the unselected antenna to a different power measurer than the rest of the data subframe. Here, the switch 517 may be a demultiplexer.

First and second power measurers 519 and 521 measure the power of signals received from the first and second output terminals of the switch 517, respectively. They measure power levels in different ways. That is, the power measurers 519 and 521 differ in power measuring duration depending upon their received signal segments, and obtain the respective average values of the signal power levels measured for different duration, in such a way that the measurement of signal power levels can be said to be performed under the same condition. For this purpose, the power measurers 519 and 521 may be so configured as to measure the power of a signal transmitted through a selected antenna or an unselected antenna in subframe units. In this case, a power measurer for receiving a signal through a selected antenna under the control of the controller 515 measures the received PCG signals and then averages them to be expressed in terms of signals transmitted through an unselected antenna. A comparator 523 compares the outputs of the first and second power measurers 519 and 521 and generates the antenna selection message AS, which is applied to an upper-level processor and a multiplexer 525. Here, the first and second power measurers 519 and 521 and the comparator 523 may be configured to be a decision unit for generating an antenna selection signal.

Then, the multiplexer 525 multiplexes an input reverse link transmit data signal and the output of the comparator 523, and a channel transmitter 527 encodes and modulates the output of the multiplexer 525. An RF transmitter 529 converts a transmit signal received from the channel transmitter 527 to an RF signal for transmission.

Figure 6:
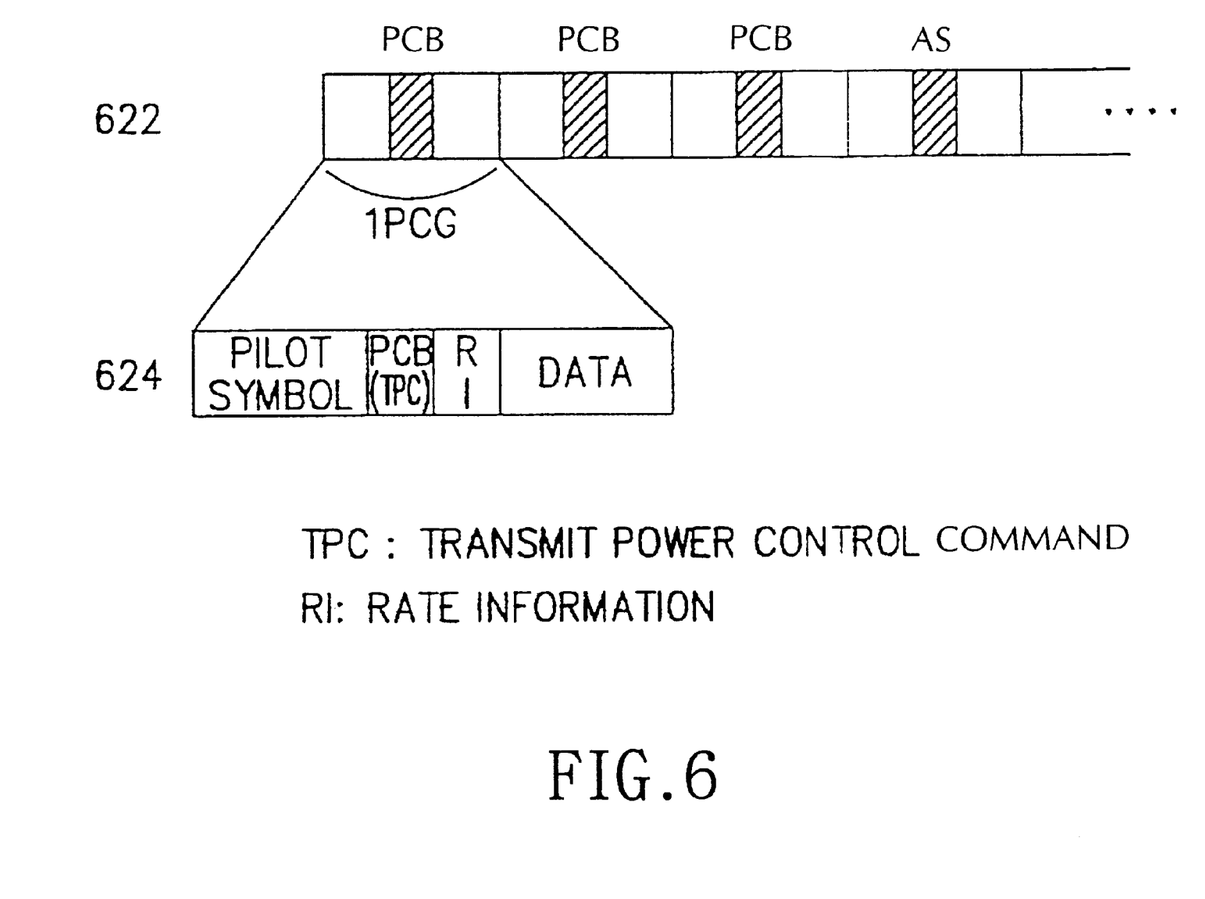
FIG. 6 illustrates a frame structure and PCGs output from the receiving device shown in FIG. 5.

FIG. 6 illustrates the format of a transmit signal output from the multiplexer 525 of the terminal. In FIG. 6, reference numeral 622 denotes a traffic channel signal transmitted from the terminal to the base station in a subframe unit, and reference numeral 624 denotes a PCG in a subframe. As indicated by 622, the terminal inserts the antenna selection message AS in the PCB area of a predetermined PCG. In the embodiments of the present invention, a subframe includes 4 PCGs, and the antenna selection message AS is inserted in the PCB area of the last PCG in each subframe.

In summary, FIGS. 5 and 6 describe the receiving device of a terminal which supports STD. The channel receiver 513 despreads and demodulates an input traffic channel signal, and the switch 517 separately outputs a signal transmitted from a selected antenna and a signal transmitted from an unselected antenna under the control of the controller 515. The first and second power measurers 519 and 521 measure the powers of their corresponding signals received from the switch 517. The comparator 523 compares the outputs of the power measurers 519 and 521 and generates the antenna selection message AS for selecting an antenna showing a better channel quality.

The multiplexer 525 multiplexes the antenna selection message AS and traffic channel data. Here, the multiplexer 525 inserts the antenna selection message AS in the PCB area of a predetermined PCG, for example, the fourth PCG in each subframe, as indicated by 622 of FIG. 6 in the embodiments of the present invention. The channel transmitter 527 encodes and spreads the signal received from the multiplexer 525 and outputs the resulting signal as a reverse link RF signal through the RF transmitter 529.

Figure 7:
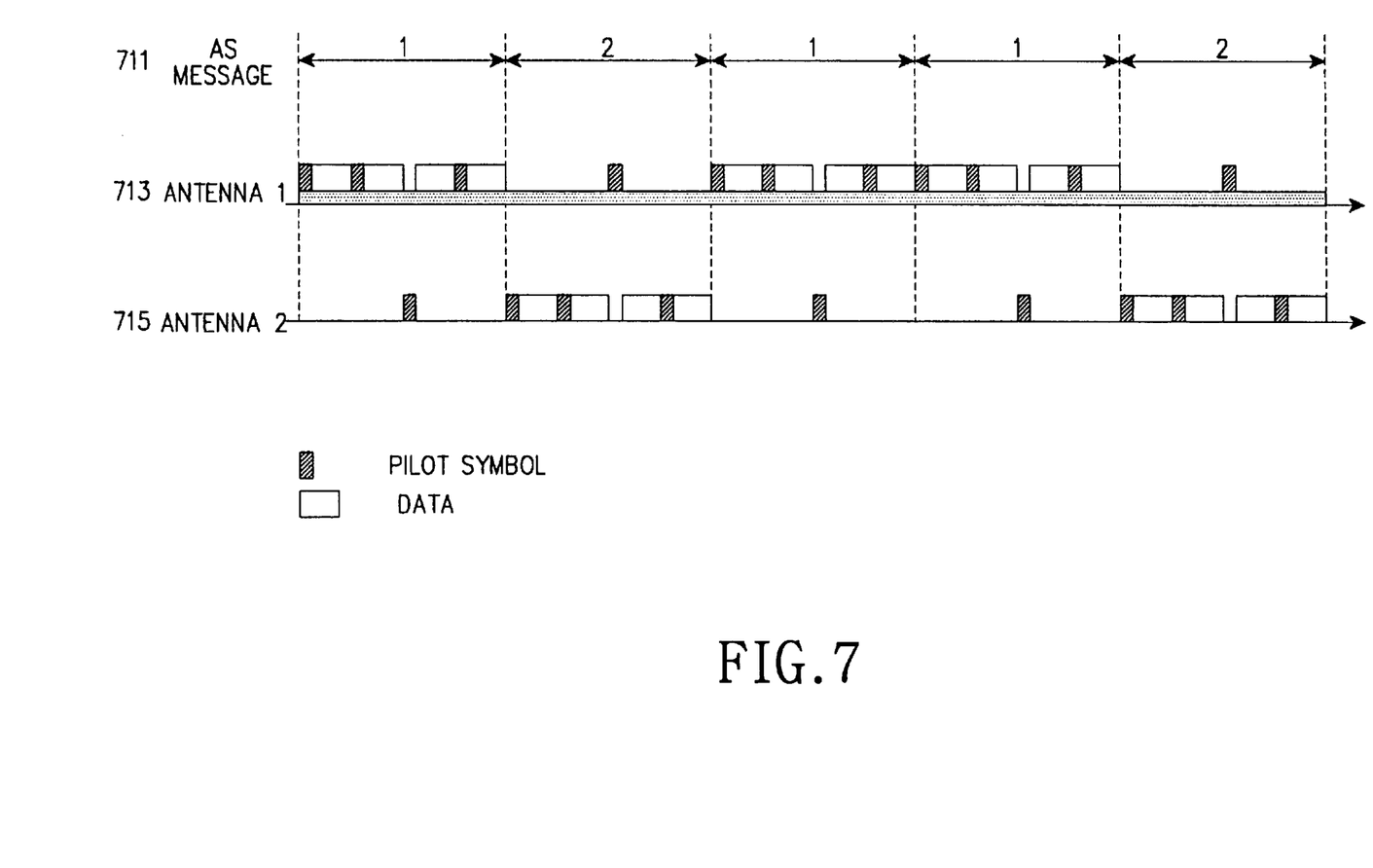
FIG. 7 illustrates a diagram of signal transmission of an embodiment of an STD operation according to the present invention.
Figure 8:
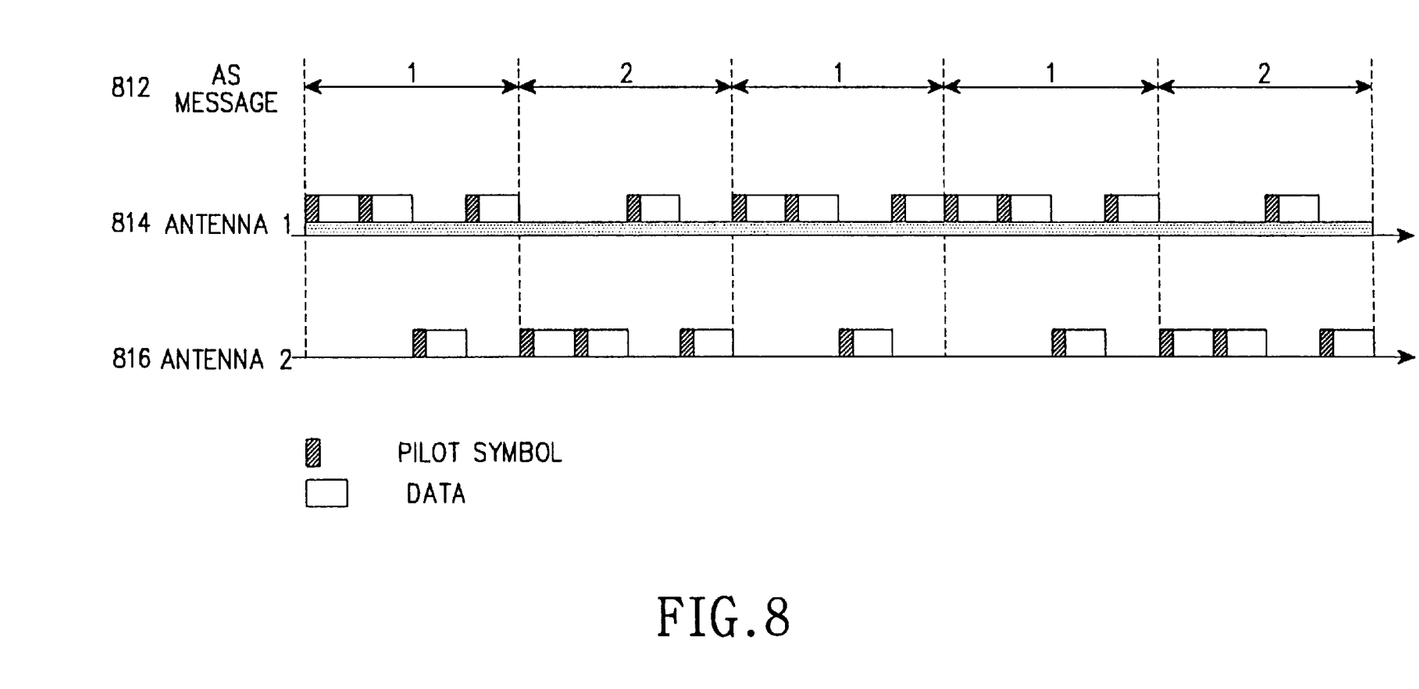
FIG. 8 illustrates a diagram of signal transmission of another embodiment of an STD operation according to the present invention.
Figure 9:
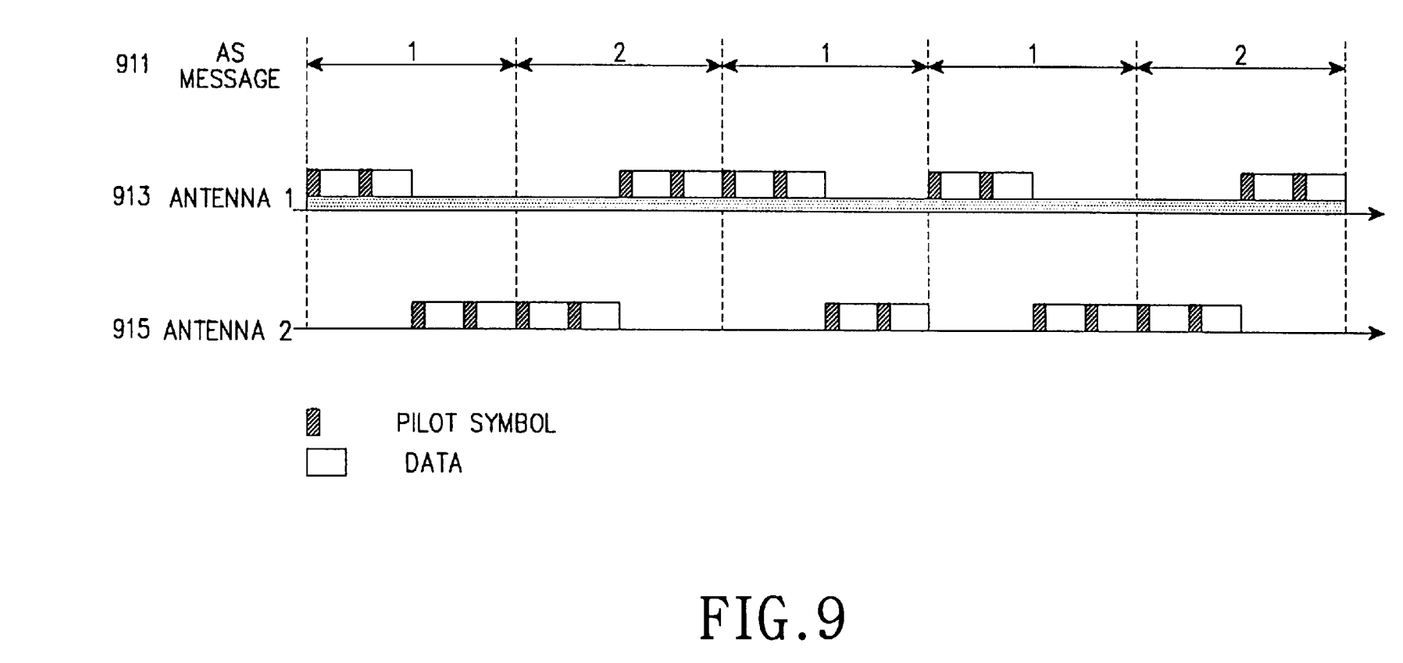
FIG. 9 illustrates a diagram of signal transmission of a third embodiment of an STD operation according to the present invention.

FIGS. 7, 8, and 9 show the different sizes of switched sections in a STD communication system according to first to third embodiments of the present invention. In the description of the drawings, a common channel signal is assumed to be transmitted through the first antenna 351 alone.

FIG. 7 shows a STD operation mode according to the first embodiment of the present invention. In FIG. 7, the common channel is confined to one antenna for transmission, intended data is transmitted through an antenna selected by an antenna selection message, and a pilot symbol in a predetermined position of each subframe is transmitted through an unselected antenna. That is, the pilot symbol of a predetermined PCG in a subframe having four PCGs is transmitted through an antenna other than one selected based on the antenna selection message. The remaining signal of the predetermined PCG except for the pilot symbol is transmitted through the selected antenna, and the pilot symbol is transmitted through the unselected antenna.

Referring back to FIG. 3, in the first embodiment of the present invention, the output of the common channel 31 is fed to the first antenna 351 alone, through the adder 335. The switch 333 is coupled toward an antenna through which the output of the traffic channel transmitter 32 is to be transmitted by the antenna selection message AS received from a terminal as indicated by 711 in FIG. 7. If the antenna selection message AS indicates the first antenna 351, the switch 333 switches the output of the traffic channel transmitter 32 to the adder 335. Then, the common channel signal and the traffic channel signal added in the adder 335 as indicated by 713 are transmitted through the first antenna 351. Here, a PCG of the traffic channel signal has a format as indicated by 413 of FIG. 4 and one subframe includes four PCGs as indicated by 411 of FIG. 4. Therefore, the traffic channel signal in which one PCG has a pilot symbol, PCB, RI, and data is transmitted together with the common channel signal through the first antenna 351.

In this embodiment, the controller 331 switches the traffic channel in order to transmit the pilot symbol of a predetermined PCG in a subframe through an unselected antenna. Assuming that the pilot symbol of the third PCG in a subframe is to be transmitted through the unselected antenna, the controller 331 directs the switch 333 to send the pilot symbol of the third PCG to the unselected second antenna 353 as indicated by 715 of FIG. 7 although the rest of the traffic channel signal is transmitted through the first antenna 351.

Referring to FIG. 5, upon reception of the first subframe of the traffic channel signal shown in FIG. 7, the RF receiver 511 of the receiving device converts the received signal to a baseband signal, and the channel receiver 513 despreads the output of the RF receiver 511. The output of the channel receiver 513 is fed to the signal processor and the switch 517. The switch (demultiplexer) 517 selectively outputs the received signal under the control of the controller 515 which generates the same switch controlling signal as from the controller 331 of the transmitting device. Thus, the switch 517 feeds the traffic channel signal from the antenna selected in a subframe unit and the pilot symbol of the predetermined PCG to different corresponding power measurers 519 and 521. The controller 515 and the switch 517 function to separately output the traffic channel signal from the selected antenna and the traffic channel signal from the unselected antenna.

Then, the first and second power measurers 519 and 521 measure the powers of signals received from the switch 517, respectively. They can detect their corresponding signals in subframes or pilot symbols from the controller 515. The power measurers 519 and 521 differ in power measuring duration depending upon their received signal segments, and obtain the respective average values of the signal power levels measured for different duration, in such a way that the measurement of signal power levels can be said to be performed under the same condition. The comparator 523 compares the outputs of the first and second power measurers 519 and 521 and generates the antenna selection message AS. If the signal quality of the second antenna 353 is better, the comparator 523 generates the antenna selection message for selecting the second antenna 353.

Upon generation of the antenna selection message AS for selecting the second antenna 353 from the terminal, the switch 333 switches the output of the traffic channel transmitter 32 to the RF transmitter 339. Then, the traffic channel signal in the second subframe is transmitted through the second antenna 353, and the third pilot symbol of the subframe is transmitted through the first antenna 351, as indicated by 715 of FIG. 7. The output of the common channel transmitter 31 is consistently transmitted through the first antenna 351 as described above.

Therefore, in the STD operation according to the first embodiment of the present invention, the traffic channel signal of a corresponding subframe is output based on the antenna selection message AS received from the terminal, as indicated by 711 of FIG. 7. As indicated by 713 and 715, the traffic channel signal of a corresponding subframe is transmitted through a selected antenna, and the pilot symbol of a predetermined PCG through an unselected antenna. In conclusion, the common channel signal is transmitted through an antenna alone, data through an antenna selected by an antenna selection message, and the pilot symbol in a predetermined location of each subframe through an unselected antenna.

FIG. 8 shows a STD operation mode according to the second embodiment of the present invention. In FIG. 8, the common channel signal is confined to one antenna for transmission, intended data is transmitted through an antenna selected by an antenna selection message, and a PCG in a predetermined position of each subframe is transmitted through an unselected antenna. That is, one of four PCGs in a subframe is transmitted through the unselected antenna in this embodiment. Thus, the remaining PCGs of the subframe except for the predetermined PCG are transmitted through the selected antenna.

Referring to FIGS. 3 and 8, the output of the common channel 31 is fed to the first antenna 351 alone, through the adder 335. The switch 333 is coupled toward an antenna through which the output of the traffic channel transmitter 32 is to be transmitted based on the antenna selection message AS received from a terminal as indicated by 812. If the antenna selection message AS indicates the first antenna 351, the switch 333 switches the output of the traffic channel transmitter 32 to the adder 335. Then, the common channel signal and the traffic channel signal added in the adder 335 as indicated by 814 are transmitted through the first antenna 351. Here, a PCG of the traffic channel signal has a format as indicated by 413 of FIG. 4 and one subframe includes four PCGs as indicated by 411 of FIG. 4. Therefore, the traffic channel signal in subframe units is transmitted together with the common channel signal through the first antenna 351.

In this embodiment, the controller 331 switches the traffic channel in order to transmit a predetermined PCG of a subframe through an unselected antenna. Assuming that the third PCG in a subframe is to be transmitted through the unselected antenna, the controller 331 controls the switch 333 to send the third PCG to the unselected second antenna 353 as indicated by 816 of FIG. 8 although the rest of the traffic channel signal is transmitted through the first antenna 351.

With reference to FIG. 5, upon reception of the first subframe of the traffic channel signal shown in FIG. 8, the RF receiver 511 of the receiving device converts the received signal to a baseband signal, and the channel receiver 513 despreads and demodulates the output of the RF receiver 511. The output of the channel receiver 513 is fed to the signal processor and the switch 517. The switch 517 selectively outputs the received signal under the control of the controller 515 which generates the same switch controlling signal as from the controller 331 of the transmitting device. Thus, the switch 517 feeds the traffic channel signal from the antenna selected in a subframe unit and the predetermined PCG to different corresponding power measurers 519 and 521. The controller 515 and the switch 517 function to separately output the traffic channel signal from the selected antenna and the traffic channel signal from the unselected antenna.

Then, the first and second power measurers 519 and 521 measure the powers of signals received from the switch 517, respectively. They can detect their corresponding signals in subframes or pilot symbols from the controller 515. The power measurers 519 and 521 differ in power measuring duration depending upon their received signal segments, and obtain the respective average values of the signal power levels measured for different duration. Then, the comparator 523 compares the outputs of the first and second power measurers 519 and 521 and generates the antenna selection message AS for selecting a better quality antenna. If the signal quality of the second antenna 353 is better, the comparator 523 generates the antenna selection message for selecting the second antenna 353.

Upon generation of the antenna selection message AS for selecting the second antenna 353 from the terminal, the switch 333 switches the output of the traffic channel transmitter 32 to the RF transmitter 339. Then, the traffic channel signal in the second subframe is transmitted through the second antenna 353, and the third PCG of the subframe is transmitted through the first antenna 351, as shown in FIG. 8. The output of the common channel transmitter 31 is consistently transmitted through the first antenna 351 as described above.

Therefore, in the STD operation according to the second embodiment of the present invention, the traffic channel signal of a corresponding subframe is output based on the antenna selection message AS received from the terminal, as indicated by 812 of FIG. 8. As indicated by 814 and 816, the traffic channel signal of a corresponding subframe is transmitted through a selected antenna, and a predetermined PCG of the subframe through an unselected antenna. In conclusion, the common channel signal is transmitted through a predetermined antenna alone, data through an antenna selected by an antenna selection message, and a PCG signal in a predetermined location of each subframe through an unselected antenna.

FIG. 9 shows a STD operation mode according to the third embodiment of the present invention. In FIG. 9, the common channel signal is confined to one antenna for transmission, part of a traffic channel signal is transmitted through an antenna selected by an antenna selection message AS, and the remaining traffic channel signal is transmitted through an unselected antenna. That is, two of four PCGs in a subframe are transmitted through the selected antenna and the other two PCGs through the unselected antenna in this embodiment. Thus, a half of the PCGs in a subframe are transmitted through the selected antenna, and the remaining half of the PCGs through the unselected antenna.

Referring to FIGS. 3 and 9, the output of the common channel 31 is fed to the first antenna 351 alone, through the adder 335. The switch 333 is coupled toward an antenna through which the output of the traffic channel transmitter 32 is to be transmitted by the antenna selection message AS received from a terminal as indicated by 911. If the antenna selection message AS indicates the first antenna 351, the switch 333 switches the output of the traffic channel transmitter 32 to the adder 335. Then, the common channel signal and the traffic channel signal are transmitted through the first antenna 351 as indicated by 913.

In this embodiment, the controller 331 switches the traffic channel in order to transmit the remaining PCGs of a subframe via an unselected antenna. When the first and second PCGs in a subframe are transmitted via the first antenna 315, the controller 331 directs the switch 333 to send the third and fourth PCGs to the unselected second antenna 353 as indicated by 915 of FIG. 9.

Therefore, in the STD operation according to the third embodiment of the present invention, the traffic channel signal is output based on the antenna selection message AS received from the terminal, as indicated by 911 of FIG. 9. As indicated by 913 and 915, the first half of PCGs in a corresponding subframe are transmitted through a selected antenna, and the last half of PCGs through an unselected antenna. In conclusion, the common channel signal is transmitted through a predetermined antenna alone, the first half of PCGs in a subframe through an antenna selected by an antenna selection message, and the other half of PCGs through an unselected antenna.

While the embodiments of the present invention have been described in which switching of antennas is controlled in subframe units in an STD mobile communication system, the switching period may be a power control period or a frame period.

Further, signals are transmitted through a selected antenna and an unselected antenna with the same transmit power in the embodiments of the present invention. Yet, the transmit power of the unselected antenna can be varied. In this case, the power measurer of the receiving device determines the power ratios of transmit signals output from the antennas and measures the power levels of received signals in consideration of the power ratios.

The transmit signal via the unselected antenna is given as the pilot symbol of a predetermined PCG in the first embodiment, a predetermined PCG signal in the second embodiment, and a half of PCGs in a subframe in the third embodiment. But the pilot symbols of a plurality of PCGs can be transmitted through the unselected antenna in the first embodiment, and a plurality of PCGs in the second embodiment.

As described above, a traffic channel signal is transmitted via an antenna having a good channel quality, a predetermined PCG or the pilot symbol of a predetermined PCG is transmitted through an unselected antenna, and a receiving device measures the strengths of signals received from the antennas to select an antenna of a good reception quality in the STD method according to the present invention. Therefore, the traffic channel signal is transmitted through the good quality antenna alone. Also, since a common channel signal is output through only one predetermined antenna, channel efficiency and power efficiency are increased.

While the present invention has been described in detail with reference to the specific embodiments, they are mere exemplary applications. Thus, it is to be is clearly understood that many variations can be made by anyone skilled in the art within the scope and spirit of the present invention.

What is claimed is:

1. A communication method with transmit diversity in a base station having at least two transmission antennas in a mobile communication system, comprising the steps of:

selecting a transmission antenna through which to send a traffic channel signal, based on an antenna selection signal received from a terminal;

transmitting the traffic channel signal through the selected antenna; and selecting a single predetermined segment from the traffic channel signal for comparison with the traffic channel signal, the comparison used for a determination related to transmission diversity, and transmitting the predetermined segment of the traffic channel signal through an unselected antenna alone, wherein the predetermined segment is substantially less than the traffic channel signal as transmitted through the selected antenna.

2. The method of claim 1, wherein a transmission period of the selected antenna is different from that of the unselected antenna.

3. The method of claim 1, wherein said traffic channel signal includes at least two PCGs (Power Control Groups) and the traffic channel signal transmitted through the unselected antenna is a pilot symbol contained in at least one PCG.

4. The method of claim 1, wherein said traffic channel signal includes at least two PCGs and the traffic channel signal transmitted through the unselected antenna is at least one PCG.

5. A communication method with transmit diversity in a base station having at least two transmission antennas, one of the transmission antennas used for sending a common channel signal, in a mobile communication system, comprising the steps of:

selecting a transmission antenna through which to send a traffic channel signal, based on an antenna selection signal received from a terminal;

transmitting the traffic channel signal through the selected antenna;

selecting a single predetermined segment from the traffic channel signal for comparison with the traffic channel signal, the comparison used for a determination related to transmission diversity, and transmitting the predetermined segment of the traffic channel signal through an unselected antenna alone, wherein the predetermined segment is substantially less than the traffic channel signal as transmitted through the selected antenna; and repeating the above steps upon reception of the antenna selection signal.

6. A communication method with transmit diversity in a base station having at least two transmission antennas in a mobile communication system, comprising the steps of:

selecting a transmission antenna based on an antenna selection signal received from a terminal;

transmitting a first segment of a traffic signal through the selected antenna; and selecting and transmitting a single second segment of the traffic signal through an unselected antenna alone for use in transmission diversity comparison with the first segment of the traffic signal, wherein the second segment is substantially less than the traffic channel signal as transmitted through the selected antenna.

7. The method of claim 6, wherein the traffic channel signal is comprised of a subframe including at least two PCGs.

8. The method of claim 7, wherein the second segment of the traffic channel signal is a pilot symbol contained in a PCG of the subframe.

9. The method of claim 7, wherein the second segment of the traffic channel signal is a PCG in the subframe.

10. The method of claim 6, wherein a common channel signal is transmitted through one of the two antennas.

11. A power controlling method in a mobile station of a mobile communication system in which a base station has at least two antennas, selects one of the antennas in response to an antenna selection signal, and transmits a first segment of a transmit signal through the selected antenna and selects and transmits a single second segment of the transmit signal through an unselected antenna alone for use in transmission diversity comparison with the first segment of the transmit signal, the second segment being substantially less than the first segment, the method comprising the steps of:

receiving the transmit signal from the base station;

separating the first and second segments from the received signal;

measuring the powers of the first and second segments, analyzing the measurements, and generating the antenna selection signal;

multiplexing the antenna selection signal on a predetermined reverse channel for transmission.

12. The method of claim 11, wherein the transmit signal is comprised of a subframe including at least two PCGs.

13. The method of claim 12, wherein the second segment of the transmit signal is a pilot symbol contained in a PCG of the subframe.

14. The method of claim 12, wherein the second segment of the transmit signal is a PCG in the subframe.

15. The method of claim 11, wherein the power of the first segment is averaged to be compared with the power of the second segment.

16. A communication device with transmit diversity in a base station having at least two antennas in a mobile communication system, comprising:

a channel receiver for receiving an antenna selection signal from a terminal;

a channel transmitter for generating a traffic channel signal; and an antenna selector for selecting one of the two antennas in response to the antenna selection signal, and connecting the output of the channel transmitter to the selected antenna for a first period and to an unselected antenna alone for a single second period for use in transmission diversity comparison with the output of the channel transmitter to the selected antenna for the first period, the second period being substantially less than the first period.

17. A communication device in a mobile station of a mobile communication system in which a base station has at least two antennas, selects one of the antennas in response to an antenna selection signal, and transmits a first segment of a transmit signal through the selected antenna and a single second segment of the transmit signal through an unselected antenna alone for use in transmission diversity comparison with the first segment of the transmit signal, the second segment being substantially less than the first segment, comprising:

a channel receiver for receiving the signal from the base station;

a separator for separating the first and second segments from the received signal;

a decision unit for measuring the powers of the separated first and second segments, analyzing the measurements, and generating the antenna selection signal; and a multiplexer for multiplexing the antenna selection signal on a predetermined reverse channel for transmission.

18. The device of claim 17, wherein the decision unit comprises:

at least two power measurers for measuring the powers of the separated first and second segments of the signal and averaging the power of the first segment to be compared with the power of the second segment; and a comparator for comparing the powers of the first and second segments and generating the antenna selection signal.

* * * * *